United States Patent [19]

Herbert

[11] Patent Number: 4,588,004

[45] Date of Patent: May 13, 1986

[54] BLENDER CUP WITH PIVOTABLE MEASURING DEVICE MOUNTED THEREIN

[76] Inventor: John M. Herbert, 351 Normandy Dr., Norwood, Mass. 02062

[21] Appl. No.: 685,315

[22] Filed: Dec. 24, 1984

[51] Int. Cl.⁴ ............................................. B65B 3/04
[52] U.S. Cl. .................................. 141/377; 141/284; 220/20
[58] Field of Search ...................... 141/377, 284, 124; 220/20, 20.5, 21, 22, 22.1, 22.2, 22.3, 22.4, 22.5, 22.6; 222/145

[56] References Cited

U.S. PATENT DOCUMENTS 747,374 12/1903 Cherne et al. ...................... 141/377

Primary Examiner—Houston S. Bell, Jr.
Attorney, Agent, or Firm—Wolf, Greenfield & Sacks

[57] ABSTRACT

An improved blender cup having a measuring device mounted within the cup and pivotably movable so that the device may conveniently receive an ingredient while in one position, and then may be readily pivoted to a second position whereby the ingredient is emptied into the blender cup. The device is preferably removable to facilitate repair, replacement, and cleaning.

8 Claims, 4 Drawing Figures

BLENDER CUP WITH PIVOTABLE MEASURING DEVICE MOUNTED THEREIN

BACKGROUND

This invention relates to an improved blender cup, and more particularly to a blender cup having a measuring device mounted within the cup and pivotably movable so that the device may conveniently receive an ingredient while in one position and then may be readily pivoted to a second position whereby the ingredient is emptied into the blender cup.

This invention may be more readily understood by reference to my co-pending application Ser. No. 639,420, entitled "Frozen Drink Apparatus," which application is incorporated herein by reference. I there describe an apparatus for preparing frozen drinks in which a blender is combined with a "slush-making" machine to facilitate the making of "frozen" drinks. That apparatus utilizes a blender cup for receipt of the drink ingredients. In making a frozen drink with that apparatus, the base liquid, consisting of fruit, liquor, etc., is first added to the blender cup, and then slush is added from the spout or discharge port of the slush making machine. One of the primary advantages of that apparatus is its saving of time of the bartender by reducing the number of physical movements and the amount of time required to make a frozen drink.

The present invention further reduces the number of physical movements required in making a frozen drink. Typically, a bartender would measure out a desired amount of one of the base ingredients in a ladle or measuring cup and then add that amount of ingredient to the blender cup. This would of course entail (1) locating and picking up the ladle or measuring cup, (2) filling it as desired with the ingredient to be added, which ingredient is usually kept in a "pour bottle" (i.e., typically a plastic bottle having at long snout), (3) pouring the contents of the ladle or measuring cup into the blender cup, and then (4) placing the ladle or measuring cup in a convenient location for use in making the next drink.

It is therefore an object of this invention to provide a device that will facilitate the addition of a measured amount of an ingredient to a blender cup.

It is a further object of this invention to provide a device that will be of particular use in connection with the making of frozen drinks by a bartender.

It is still another object of this invention to provide a device that will be easy to operate and to clean, and will save the user's time and physical energy by reducing the number of motions and the time spent in making a frozen drink or other concoction.

SUMMARY OF THE INVENTION

The foregoing objects are achieved and the foregoing problems solved by one illustrative embodiment of the invention in which an improved blender cup has a measuring device mounted within the cup and pivotably movable so that the device may conveniently receive an ingredient while in a first position, and then may be readily pivoted to a second position whereby the ingredient is emptied into the blender cup. The device may include a graduated bowl, or a bowl of predetermined volume. Preferably, the measuring device is removable for purposes of repair, replacement, cleaning, etc.

DETAILED DESCRIPTION OF THE INVENTION

Figure 1:
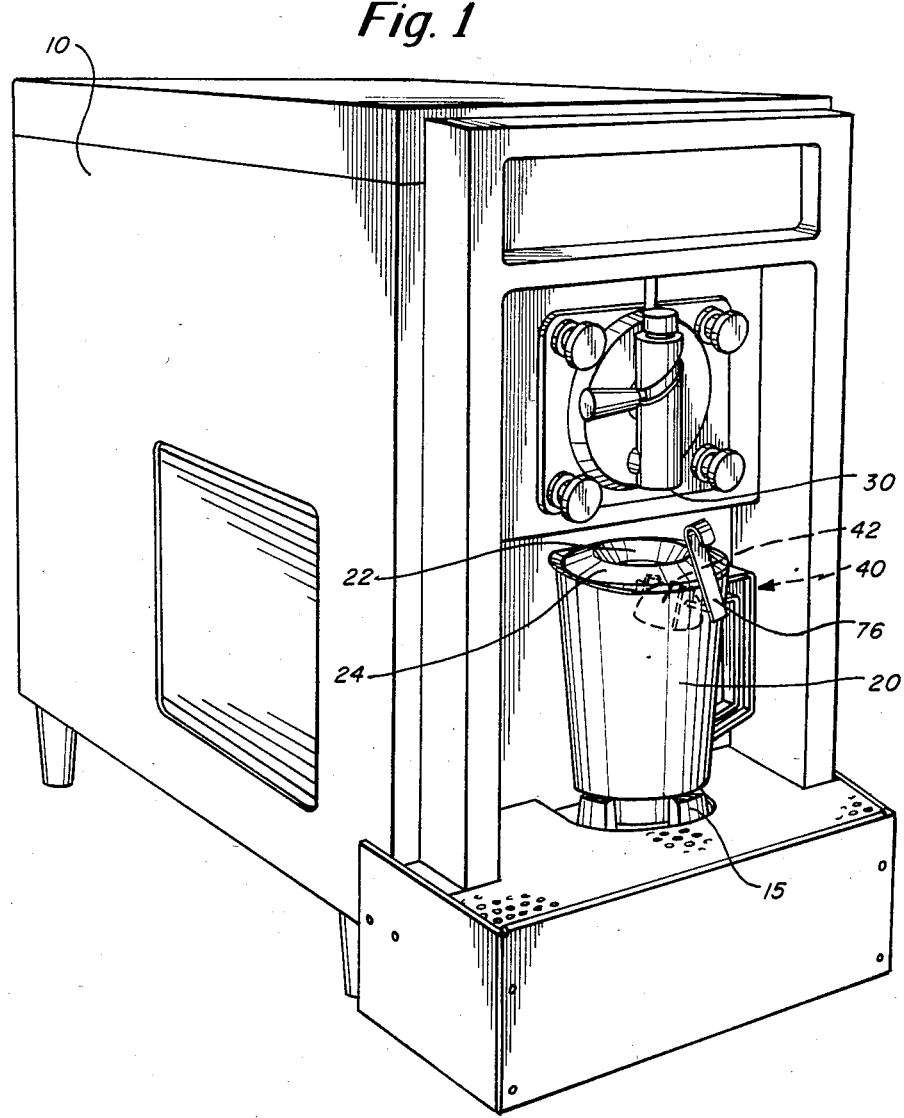
FIG. 1 is a perspective view of a frozen drink apparatus with which the improved blender cup of the present invention may be utilized.

FIG. 1 depicts, in perspective view, the preferred embodiment of the frozen drink apparatus of my aforementioned patent application. That apparatus consists of ice-slush machine 10 and a blender unit 15. A discharge port 30 is located at the front of the machine from which a finely-divided ice slush mixture may be discharged. Positioned below the discharge port 30 is blender 15 which has a glass or plastic cup 20 that holds the drink mixture to be blended. The opening 22 in the top 24 of cup 20 is located directly beneath the discharge port 30 of the ice machine. Measuring device 40 is pivotably mounted within cup 20, as is more fully explained below.

Figure 2:
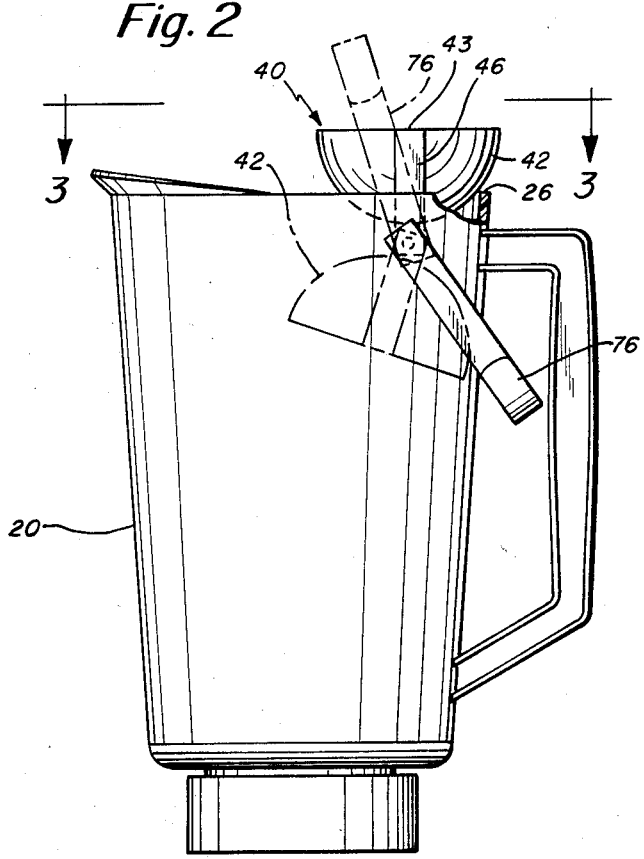
FIG. 2 is a detailed view of the improved blender cup depicted in FIG. 1, showing the two extreme positions of the pivotable measuring device mounted within the blender cup.
Figure 3:
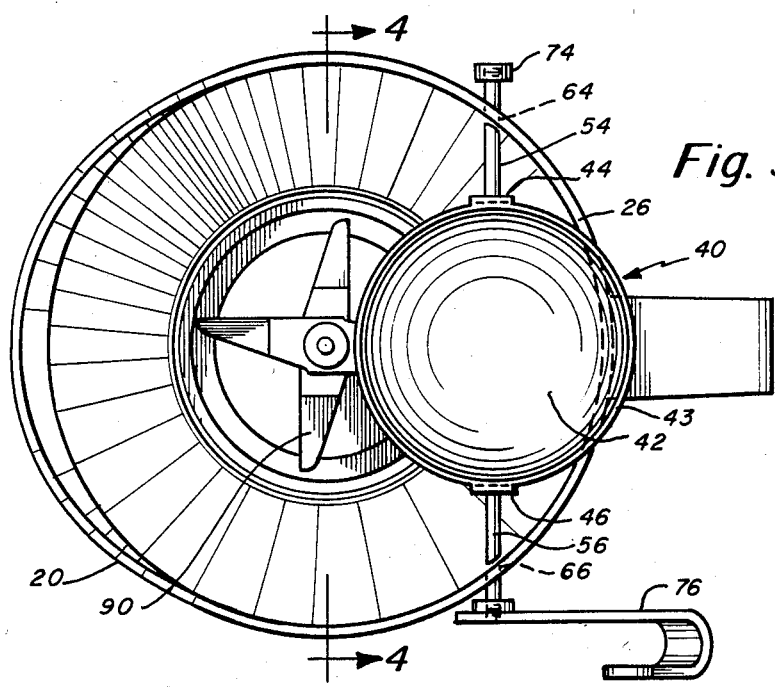
FIG. 3 is a top plan view of the improved blender cup of the present invention, as seen from the direction 3—3 of FIG. 2.
Figure 4:
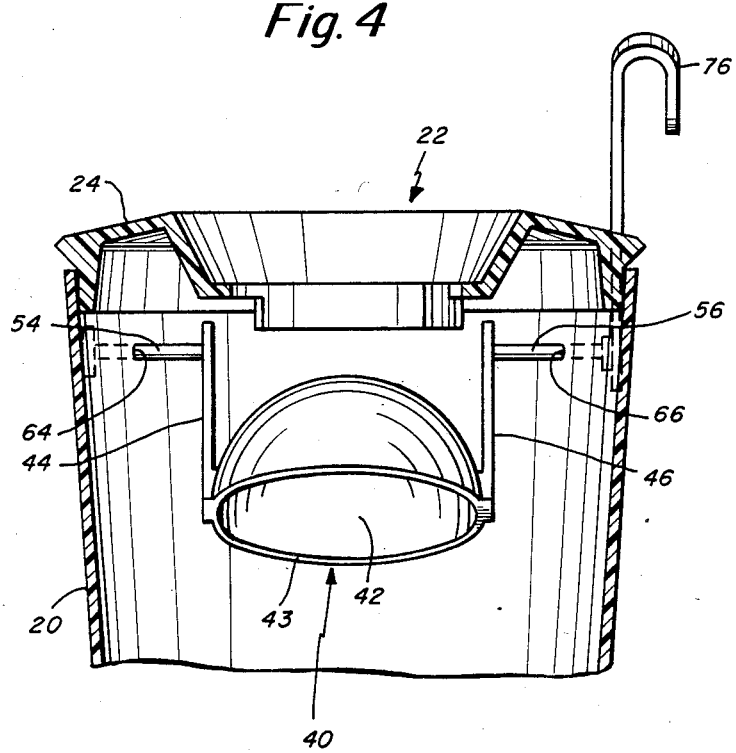
FIG. 4 is a sectional view of the improved blender cup of FIG. 3, taken along the line 4—4.

The construction and operation of a preferred embodiment of measuring device 40 is best understood with reference to FIGS. 2 through 4. Referring first to FIG. 3, measuring device 40 comprises a small bowl 42 of substantially hemispherical shape, preferably constructed of stainless steel. Measuring device 40 is mounted in cup 20, which cup contains conventional blender blades 90.

As seen in FIG. 4, arms 44 and 46 are attached (as by welding) at diametrically opposite points to bowl 42 at approximately its rim 43, said arms extending downwardly from and perpendicular to the plane of said rim. Integrally attached to arms 44 and 46 respectively are rods 54 and 56, which rods extend perpendicularly from said arms and through holes or openings 64 and 66, respectively, in cup 20. Handle 76 is integrally attached to the outer end of rod 56 at a point outside of cup 20. Nut 74 is affixed to the outer end of rod 54 outside cup 20. It is seen that bowl 42 is pivotable about the common axis of rods 54 and 56 by means of handle 76, with rods 54 and 56 being supported by said openings 64 and 66, as more fully described below. Nut 74 and handle 76 may be removably mounted to the respective outer ends of rods 54 and 56, such as by means of threads, to permit removal of measuring device 40 from cup 20 for purposes of replacement, cleaning, repair, etc.

Referring to FIG. 2, the operation of the measuring device may be readily appreciated. In solid lines is depicted a first position for measuring device 40, handle 76 pointing in a southeasterly direction. (This same position is depicted in FIG. 3). The rim 43 of bowl 42 is generally horizontal, so that bowl 42 is ready to receive an ingredient. It is to be noted that bowl 42 rests against the upper rim 26 of cup 20, which serves as a stop to hold the bowl in proper position for filling. In this first position, rim 43 of bowl 42 lies in a substantially horizontal plane, at a reasonable distance above the top rim of blender cup 20, to facilitate introduction of the desired ingredient into the bowl.

Once bowl 42 is filled as desired, handle 76 may be rotated counter-clockwise to the position shown in phantom lines in FIG. 2. (This same position is depicted in FIG. 4.) In this position, bowl 42 is seen to rest against the inside wall of cup 20, with bowl 42 opening downward so that its contents are emptied into blender cup 20. With measuring device 40 in this position, top 24 may be placed upon blender cup 20, and slush may be added to the blender cup 20 through opening 22 in top 24 (see FIG. 1). Bowl 42 is now positioned out of the way of the slush pouring into cup 20 from slush-making machine 10.

Bowl 42 may be graduated or may be dimensioned so as to hold a pre-determined volume of liquid. It has been determined that the most desirable sizes for bowl 42 are one ounce, one and one-half ounce, two ounces, and three ounces.

It will be readily appreciated by those skilled in the art that the present invention in its broader aspects is not limited to the specific embodiments herein shown and described. Accordingly, variations may be made from the embodiments described herein which are within the scope of the accompanying claims, without departing from the principles of the invention and without sacrificing its chief advantages.

I claim:

1. In a blender cup, the improvement comprising a measuring device pivotably mounted within said cup for movement between a first position, in which a desired ingredient may be introduced into the measuring device, and a second position, in which the ingredient is emptied into the blender cup.

2. The blender cup of claim 1, wherein said measuring device comprises a receptacle for receipt of said ingredient, pivot means affixed to said receptacle to permit rotation of said receptacle about an axis, and a handle attached to said pivot means at a point outside of said blender cup for causing rotation of said receptacle about said axis to cause the ingredient placed in said receptacle to be emptied into said cup.

3. The blender cup of claim 2, wherein said receptacle is substantially a hemispherical bowl, and said pivot means comprises a first pair of members attached respectively at diametrically opposite locations at approximately the rim of the hemisphere and extending in a direction substantially perpendicular to the plane of said rim and away from the opening of said receptacle, and a second pair of members attached perpendicularly to respective ones of said first set of members and extending in a direction substantially parallel to the plane of said rim and away from said receptacle, said second pair of members being coaxial, and said handle being attached to one of said second pair of members.

4. The blender cup of claim 3, wherein each of said second pair of members extends through and is supported by a respective opening in the wall of said blender cup.

5. The blender cup of claim 4, wherein said handle is removably attached to one of said second pair of members, and a removable securing device is attached to the other said member at a location outside of said blender cup, to facilitate removal of said measuring device from said blender cup.

6. The blender cup of claim 5, wherein said receptacle is graduated.

7. The blender cup of claim 5, wherein, in said first position, the receptacle rests upon the upper rim of said blender cup, with the rim of the receptacle substantially horizontal.

8. The blender cup of claim 7, wherein, in said second position, the receptacle rests against an inner wall of said blender cup, in a position so as not to cause interference with the addition of further ingredients into said blender cup from above the approximate center of the cup.

* * * * *